United States Patent
Hui et al.

(10) Patent No.: US 9,485,174 B2
(45) Date of Patent: Nov. 1, 2016

(54) ROUTING USING CACHED SOURCE ROUTES FROM MESSAGE HEADERS

(75) Inventors: Jonathan W. Hui, Belmont, CA (US); Jean-Philippe Vasseur, Saint Martin d'Uriage (FR); Pascal Thubert, La Colle sur Loup (FR); Patrick Wetterwald, Mouans Sartoux (FR)

(73) Assignee: Cisco Technology, Inc., San Jose, CA (US)

( * ) Notice: Subject to any disclaimer, the term of this patent is extended or adjusted under 35 U.S.C. 154(b) by 685 days.

(21) Appl. No.: 13/562,070

(22) Filed: Jul. 30, 2012

(65) Prior Publication Data

US 2014/0029445 A1    Jan. 30, 2014

(51) Int. Cl.
*H04L 12/721* (2013.01)
*H04L 12/747* (2013.01)

(52) U.S. Cl.
CPC .............. *H04L 45/34* (2013.01); *H04L 45/742* (2013.01)

(58) Field of Classification Search
CPC .. G06F 15/173; G06F 15/17368; H04J 3/26; H04L 12/28; H04L 12/26; H04L 12/56; H04L 12/24; H04L 45/00
See application file for complete search history.

(56) References Cited

U.S. PATENT DOCUMENTS

| | | | |
|---|---|---|---|
| 5,105,424 A * | 4/1992 | Flaig ................. | G06F 15/17368 709/243 |
| 6,092,096 A * | 7/2000 | Lewis ..................... | H04L 45/00 370/396 |
| 6,401,171 B1 | 6/2002 | Klein et al. | |
| 6,502,140 B1 | 12/2002 | Boivie | |
| 6,850,980 B1 | 2/2005 | Gourlay | |
| 6,996,678 B1 | 2/2006 | Sharma | |
| 7,251,681 B1 | 7/2007 | Gourlay | |
| 7,277,399 B1 | 10/2007 | Hughes, Jr. | |
| 7,395,348 B1 | 7/2008 | Cieslak et al. | |
| 7,487,255 B2 * | 2/2009 | Roeder ................... | H04L 45/00 709/238 |
| 7,725,598 B2 | 5/2010 | Cieslak et al. | |
| 7,848,332 B2 | 12/2010 | Lee et al. | |
| 8,208,368 B2 | 6/2012 | Holliday | |
| 2002/0024974 A1 | 2/2002 | Karagiannis et al. | |
| 2008/0279198 A1 | 11/2008 | Gruber et al. | |
| 2011/0064081 A1 | 3/2011 | Lee et al. | |
| 2013/0242996 A1 * | 9/2013 | Varvello et al. ............... | 370/392 |

OTHER PUBLICATIONS

Winter, et al., "RPL: IPv6 Routing Protocol for Low-Power and Lossy Networks", IETF Trust, Internet Engineering Task Force, Request for Comments 6550, Mar. 2012.
Vasseur, et al.,"Routing Metrics used for Path Calculation in Low Power and Lossy Networks" [RFC6551], Mar. 2012.

(Continued)

*Primary Examiner* — Andrew Lai
*Assistant Examiner* — Leon Andrews
(74) *Attorney, Agent, or Firm* — Parker Ibrahim & Berg LLC; James M. Behmke; Stephen D. LeBarron

(57) ABSTRACT

In one embodiment, an intermediate node of a computer network can receive a message intended for a destination. The message can include a header indicating a source route. The intermediate node can determine a routing entry for a routing entry for the destination associated with a next hop based on the source route and cache the routing entry. The intermediate node can further receive a second message intended for the destination that does not indicate the next hop, and transmit the second message according to the cached routing entry.

20 Claims, 11 Drawing Sheets

(56) References Cited

OTHER PUBLICATIONS

Thubert, IETF Internet Draft, entitled "Objective Function Zero for the Routing Protocol for Low-Power and Lossy Networks (RPL)" [RFC6552], Mar. 2012.

O. Gnawali et al., "The Minimum Rank Objective Function with Hysteresis" [draft-ietf-roll-minrank-hysteresis-of-11], Jun. 2012.

Finnie, et al., "Notification of Transmittal of the International Search Report and the Written Opinion of the International Searching Authority, or the Declaration", Patent Cooperation Treaty, International Application No. PCT/US2013/052540, mailed Oct. 14, 2013, 14 pages, European Patent Office, Rijswijk, Netherlands.

Hui, et al., "An IPv6 Routing Header for Source Routes with RPL" Internet Draft, draft-ietf-6man-rpl-routing-header-07, Dec. 16, 2011, 20 pages, The IETF Trust.

Johnson, et al., "DSR: The Dynamic Source Routing Protocol for Multi-Hop Wireless Ad Hoc Networks", In Ad Hoc Networking, Addison-Wesley,(2001), 25 pages, Boston, MA.

* cited by examiner

ROUTING USING CACHED SOURCE ROUTES FROM MESSAGE HEADERS

TECHNICAL FIELD

The present disclosure relates generally to computer networks, and, more particularly, to routing using cached source routes from message headers.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing protocol for LLN networks is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

In particular, RPL provides various modes of operation for maintaining routes to destinations. With respect to a non-storing mode, RPL source devices add source route header information to messages. This source route header information increases as a function of a length of a particular route to a destination. In turn, the header overhead can prove non-trivial for remote destinations that are interconnected via multiple intermediate nodes routes, which results in an increased burden on network resources required to relay the increased header overhead.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
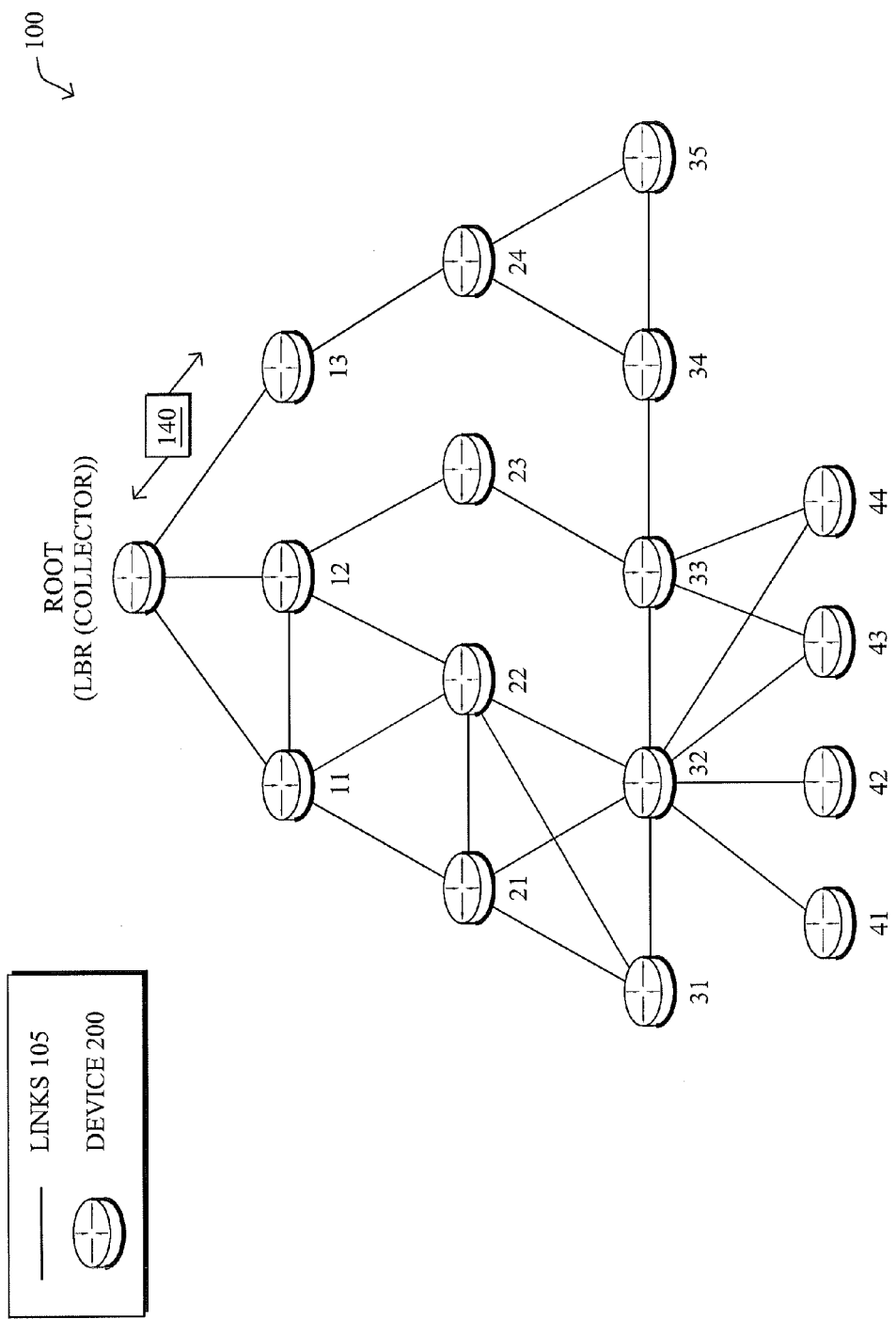
FIG. 1 illustrates an example communication network.

According to one or more embodiments of the disclosure, an intermediate node of a computer network can receive a message intended for a destination. The message can include a header indicating a source route. The intermediate node can determine a routing entry for the destination associated with a next hop based on the source route and cache the routing entry. The intermediate node can further receive a second message intended for the destination that does not indicate the next hop, and transmit the second message according to the cached routing entry.

In one or more additional embodiments of the disclosure, a root node of a computer network can transmit a first message intended for a destination and having a header indicating a source route to one or more intermediate nodes. The root node can further transmit a second message intended for the destination to the one or more intermediate nodes having a header with a subset of the source route for the destination based on one or more cached routing states of the one or more intermediate nodes.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, CPL G3, Watt Pulse Communication (WPC), and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically wireless networks, though wired connections are also available. That is, in addition to one or more sensors, each sensor device (node) in a sensor network may generally be equipped with a radio transceiver or other communication port, a microcontroller, and an energy source, such as a battery. Generally, size and cost constraints on sensor nodes result in corresponding constraints on resources such as energy, memory, computational speed and bandwidth. Correspondingly, a reactive routing protocol may, though need not, be used in place of a proactive routing protocol for sensor networks.

In certain configurations, the sensors in a sensor network transmit their data, along with routing/relaying data from other sensors, to one or more centralized or distributed database management nodes that obtain the data for use with one or more associated applications. Alternatively (or in addition), certain sensor networks provide for mechanisms by which an interested subscriber (e.g., "sink") may specifically request data from devices in the network. In a "push mode," the sensors transmit their data to the sensor sink/subscriber without prompting, e.g., at a regular interval/frequency or in response to external triggers, such as alarm messages. Conversely, in a "pull mode," the sensor sink may specifically request that the sensors (e.g., specific sensors or all sensors) transmit their current data (or take a measurement, and transmit that result) to the sensor sink. (Those skilled in the art will appreciate the benefits and shortcomings of each mode, and both apply to the techniques described herein.)

FIG. 1 is a schematic block diagram of an example computer network 100 illustratively comprising nodes/devices 200 (e.g., labeled as shown, "Root," "11," "12," . . . "43," "44") interconnected by various methods of communication. For instance, the links 105 may be wired links or may comprise a wireless communication medium, where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, while the embodiments are shown herein with reference to a generally "tree" shaped network, the description herein is not so limited, and may be applied to networks that have branches emitting to all directions from with the root node generally centralized among a plurality of surrounding nodes Illustratively, certain devices in the network may be more capable than others, such as those devices having larger memories, sustainable non-battery power supplies, etc., versus those devices having minimal memory, battery power, etc. For instance certain devices 200 may have no or limited memory capability. Also, one or more of the devices 200 may be considered "root nodes/devices" (or root capable devices), also referred to as LLN border routers (LBRs), while one or more of the devices may also be considered "destination nodes/devices." Further, as generally described herein, nodes of the network 100, generally nodes other than the root node, may be configured to report data (information), such as sensors, meters, etc.

Data packets 140 (e.g., traffic and/or messages sent between the devices/nodes) may be exchanged among the nodes/devices of the computer network 100 using predefined network communication protocols such as the Transmission Control Protocol/Internet Protocol (TCP/IP), User Datagram Protocol (UDP), Multi-Protocol Label Switching (MPLS), various proprietary protocols, etc. In this context, a protocol consists of a set of rules defining how the nodes interact with each other. In addition, packets within the network 100 may be transmitted in a different manner depending upon device capabilities, such as source routed packets.

Data packets 140 (e.g., traffic and/or messages sent between the devices/nodes) may be exchanged among the nodes/devices of the computer network 100 using predefined network communication protocols such as the Transmission Control Protocol/Internet Protocol (TCP/IP), User Datagram Protocol (UDP), Multi-Protocol Label Switching (MPLS), various proprietary protocols, etc. In this context, a protocol consists of a set of rules defining how the nodes interact with each other. In addition, packets within the network 100 may be transmitted in a different manner depending upon device capabilities, such as source routed packets.

Figure 2:
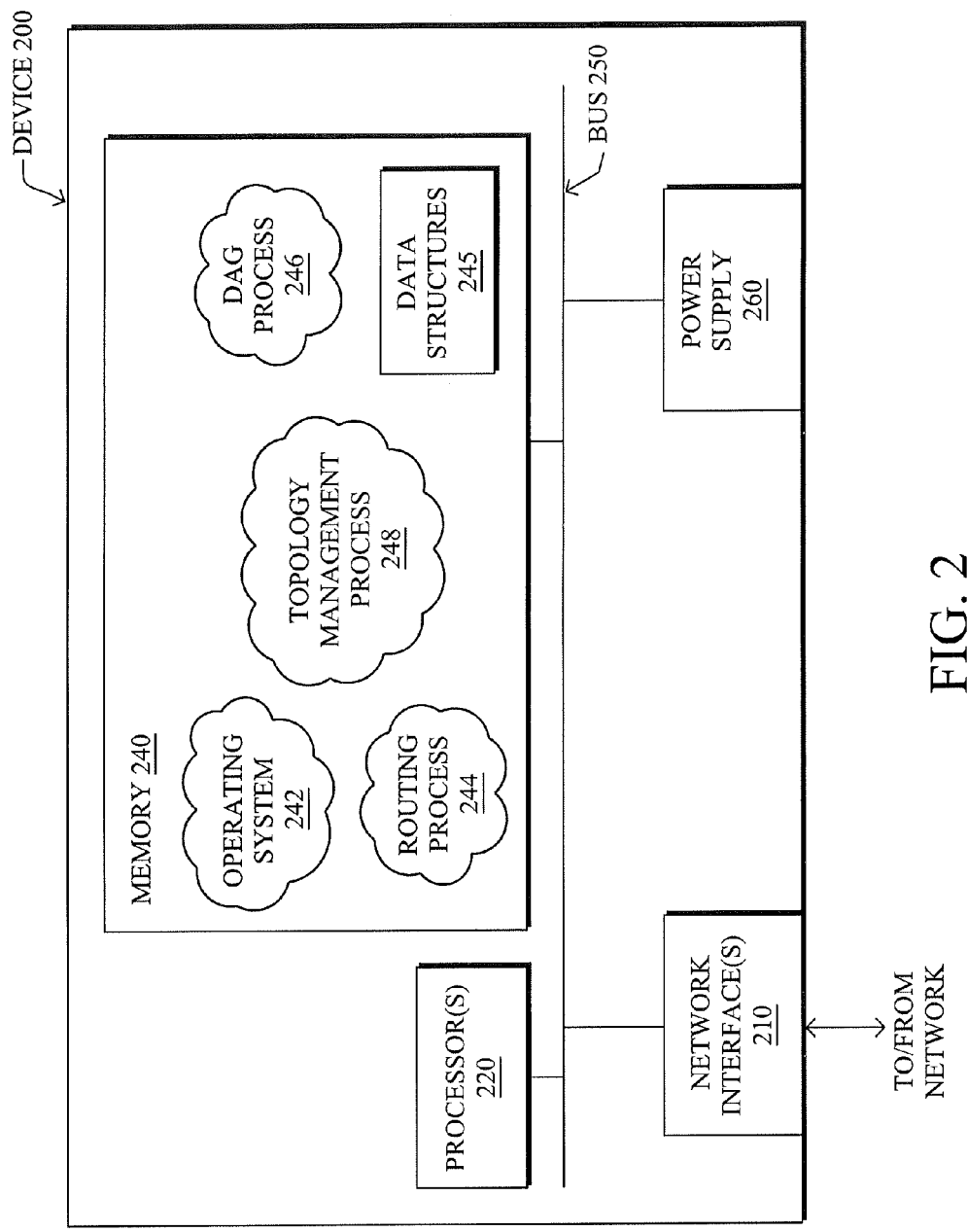
FIG. 2 illustrates an example network device/node.

FIG. 2 is a schematic block diagram of an example node/device 200 that may be used with one or more embodiments described herein, e.g., as a root node or other node (e.g., sensor, meter, etc.) in the network. The device may comprise one or more network interfaces 210, at least one processor 220 (e.g., an 8-64 bit microcontroller), and a memory 240 interconnected by a system bus 250, as well as a power supply 260 (e.g., battery, plug-in, etc.).

The network interface(s) 210 contain the mechanical, electrical, and signaling circuitry for communicating data over physical and/or wireless links coupled to the network 100. The network interfaces may be configured to transmit and/or receive data using a variety of different communication protocols, including, inter alia, TCP/IP, UDP, wireless protocols (e.g., IEEE Std. 802.15.4, WiFi, Bluetooth®,), Ethernet, powerline communication (PLC) protocols, etc. Note that the root may have two different types of network connections 210. Namely, one or more interfaces may be used to communicate with the mesh network (into the mesh cell), i.e., the other nodes shown in FIG. 1. while for the root node, another interface may be used as a WAN uplink network interface between the root node and, for example, a head-end device located through the WAN.

The memory 240 comprises a plurality of storage locations that arc addressable by the processor 220 and the network interfaces 210 for storing software programs and data structures associated with the embodiments described herein. As noted above, certain devices may have limited memory or no memory (e.g., no memory for storage other than for programs/processes operating on the device). The processor 220 may comprise necessary elements or logic adapted to execute the software programs and manipulate data structures 245, such as routes or prefixes (notably on capable devices only). An operating system 242, portions of which are typically resident in memory 240 and executed by the processor, functionally organizes the device by, inter alia, invoking operations in support of software processes and/or services executing on the device. These software processes and/or services may comprise routing process/services 244, which may include an illustrative directed acyclic graph (DAG) process 246. Also, for root devices (or other management devices), a topology management process 248 and associated stored topologies may also be present in memory 240, for use as described herein. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table 245 containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link Slate Routing (OLSR) Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (e.g., "clusterheads" or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by DAG process 246) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks" <RFC6551> by Vasseur, et al. (March 2012 version). Further, an example OF (e.g., a default OF) may be found in an IETF Internet Draft, entitled "RPL Objective Function 0" <RFC6552> by Thubert (March 2012 version) and "The Minimum Rank Objective Function with Hysteresis" <draft-ietf-roll-minrank-hysteresis-of-11> by O. Gnawali et al. (July 2012 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
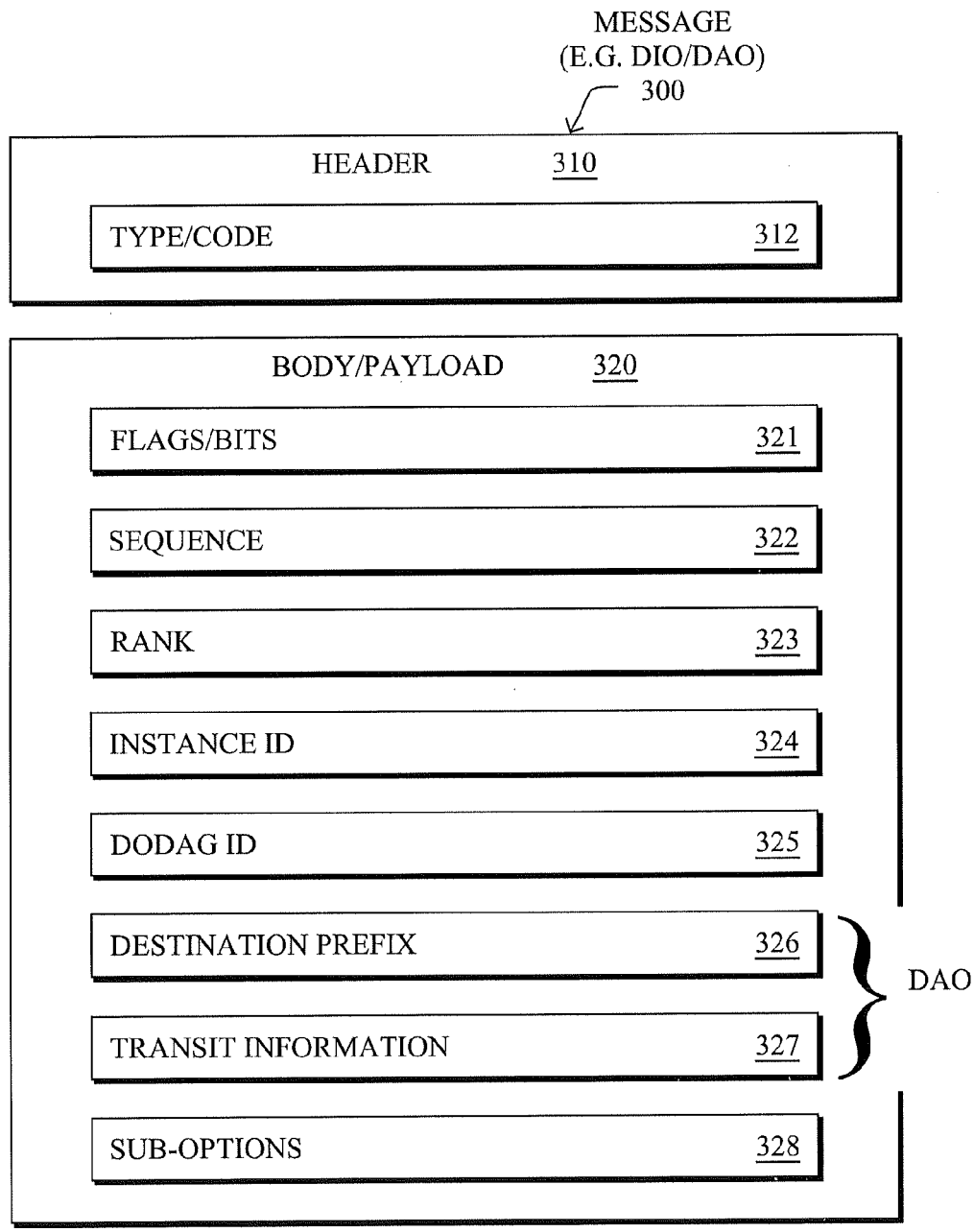
FIG. 3 illustrates an example message.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a KIM control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCT) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
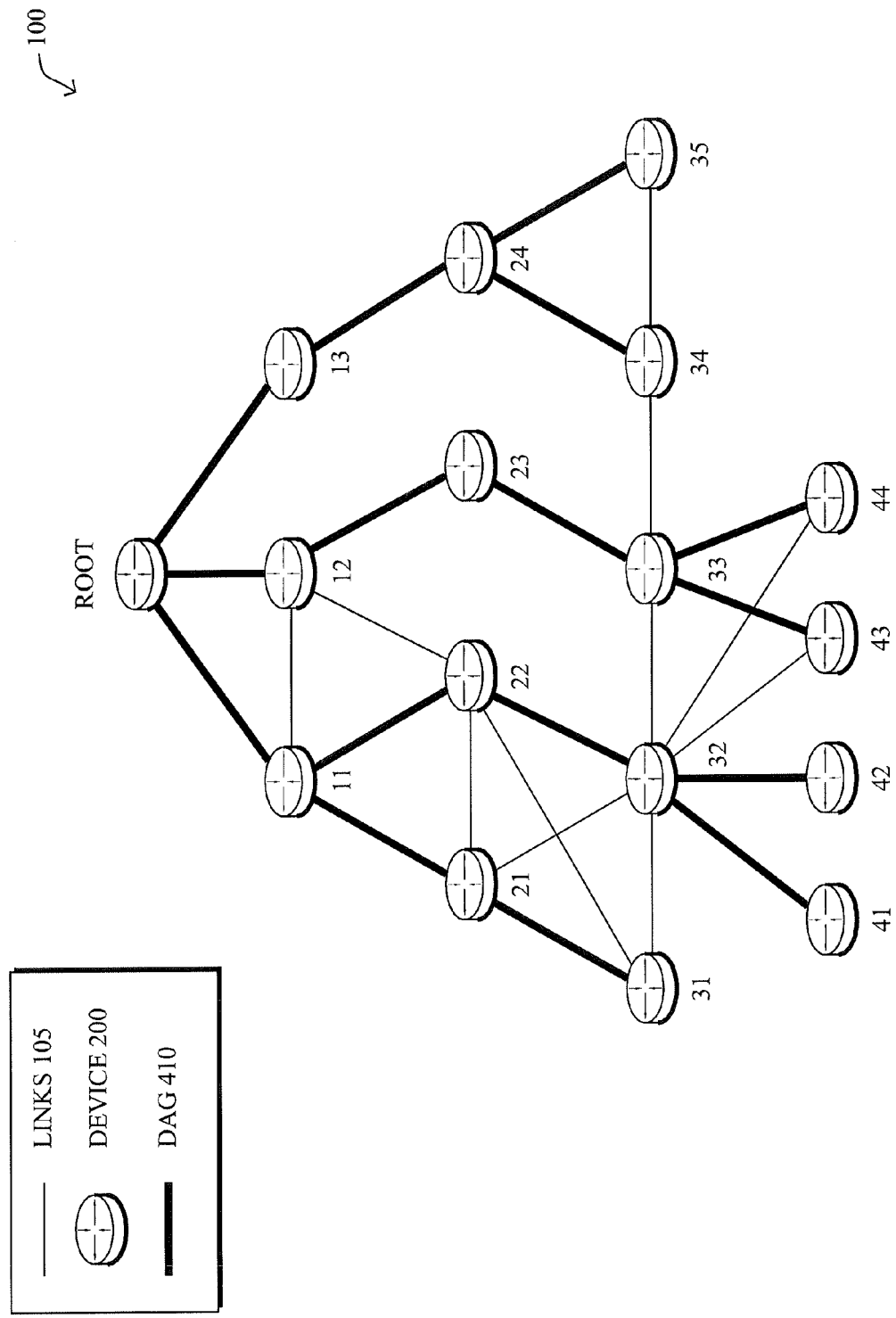
FIG. 4 illustrates an example directed acyclic graph (DAG) in the computer network of FIG. 1.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

Illustratively, the techniques described herein may be performed by hardware, software, and/or firmware, such as in accordance with the routing process 244, which may contain computer executable instructions executed by the processor 220 (or independent processor of interfaces 210) to perform functions relating to the techniques described herein, e.g., in conjunction with topology management process 248 of a root node or other management node. For example, the techniques herein may be treated as extensions to conventional protocols, such as the various routing protocols (e.g., RPL), and as such, may be processed by similar components understood in the art that execute those protocols, accordingly.

As noted above, RPL provides various modes of operation for maintaining routes to destinations. With respect to a non-storing mode, RPL source devices add source route header information to messages. This source route header information increases as a function of a length of a particular route to a destination. In turn, the header overhead can prove non-trivial for remote destinations that are interconnected via multiple intermediate nodes routes, which results in an increased burden on network resources required to relay the increased header overhead.

The techniques herein provide mechanisms that use a source route header to install, e.g., cache, routing information. For example, when an intermediate node receives a message (e.g., a source routed message) for a particular destination, the intermediate node can create a route entry for the destination and record one or more next hops towards the destination based on the source route entries. In addition, a route cache indicator within the source route header can trigger the intermediate nodes to install the routing state (including how long to maintain the routing state) should, for example, the node know that it has further packets to send to said destination. In this fashion, intermediate nodes can cache route information based on the source route of a header and reduce or eliminate the need for subsequent messages to include source route header information. Notably, in certain embodiments, a tag associated with a portion or sub-set of the source route can be cached for routing subsequent messages by the intermediate nodes.

Specifically, according to one or more embodiments of the disclosure as described in detail below, a root node can send an initial or first message intended for a destination to an intermediate node. The message can include a header indicating a source route. The intermediate node can receive the message and determine a routing entry for the destination associated with one or more next hops and cache the routing entry. The root node can further transmit a subsequent or second message intended for the destination to the one or more intermediate nodes having a subset of the source route and/or no source route based on the cached routing states of the intermediate nodes. The intermediate nodes can further transmit or distribute the second message according to the cached routing entries (e.g., for next hops, next-next hops, etc.). For example, FIGS. 5-8 illustrate examples of messages passing in the communication network according to the cached routing techniques described herein.

Figure 5:
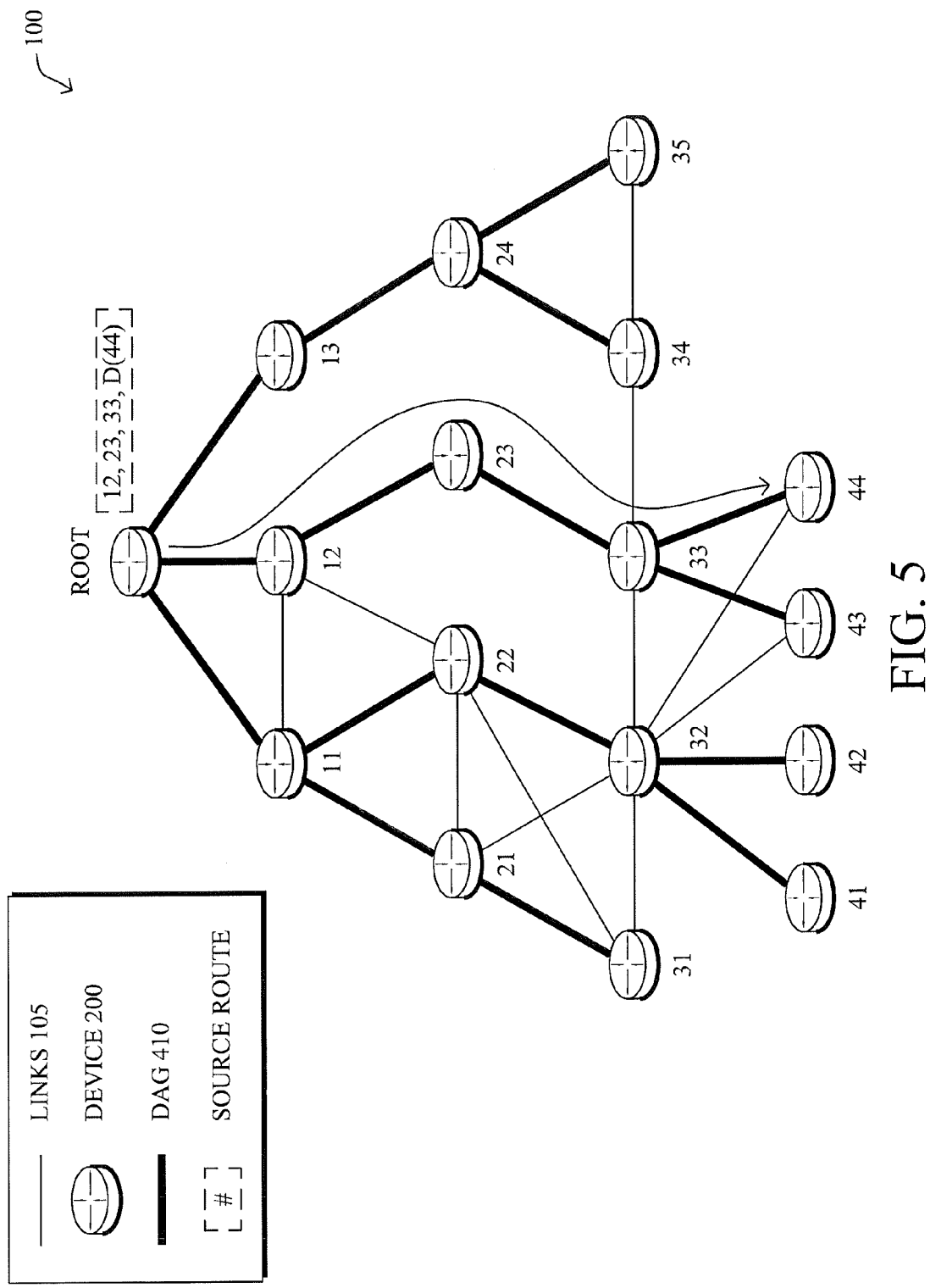
FIGS. 5-8 illustrate examples of messages passing in the DAG network according to cached routing techniques.

In particular, FIG. 5 illustrates routing an initial message having a header with a source route of (12, 23, 33, D(44)) and intended for a destination node 44. Notably, the intermediate nodes along the path receive the initial message having the source route and can cache subsequent next hop nodes provided in the header associated with the destination. That is, each intermediate node can analyze the header having the entire source path associated with messages for a particular destination node (e.g., destination node 44) and identify respective subsequent next hops. For example, intermediate node 12 receives the source route header and can determine that a next hop from the header is intermediate node 23. Intermediate node 12 can further cache a routing entry for the next hop node 23 as associated with destination node 44.

In some embodiments, the cached routing state (e.g., the number of route entries for various node along the source route) may first be communicated with the root node and, in response, the root node can generate and transmit messages for the destination having a subset of the source route based on the cached routing state for each intermediate node. For example, the intermediate nodes may have varied network capability (e.g., memory, data resources, etc.) and may cache more or less of the source route accordingly. In these embodiments, a node may send a message to the root node indicating that it has sufficient resources (e.g., memory, etc.) to store intermediate routing entries. In yet another embodiment, the intermediate node can send an acknowledge message to the root node confirming that a particular routing state has been cached and installed along the entire source route path. In other embodiments, higher-layer protocols that have bi-directional traffic (e.g. TCP) may implicitly acknowledge the packet and no additional control packet is required.

Referring still to FIG. 5, the root node has visibility of the complete network of nodes including various routing states for the intermediate nodes along source route paths. If a particular route will be used again in the near future (e.g., to transmit subsequent messages to destination node 44), the root node can transmit a message with a source route header having a route cache indicator (e.g., a flag) to one or more intermediate nodes. This route cache indicator may indicate a time period for the particular intermediate node to cache a respective routing entry (e.g., based on historical data, reachability and stability of next hops, etc.). Moreover, the particular intermediate node can also probe a link associated with the routing entry to ensure reachability and transmit control messages (e.g., internet message control protocol (ICMP) errors, link reliability reports, etc.) indicating the reachability to the root node. In turn, the root node can determine optimal paths to a destination balancing memory, link reliability, and transmission overhead.

Figure 6:
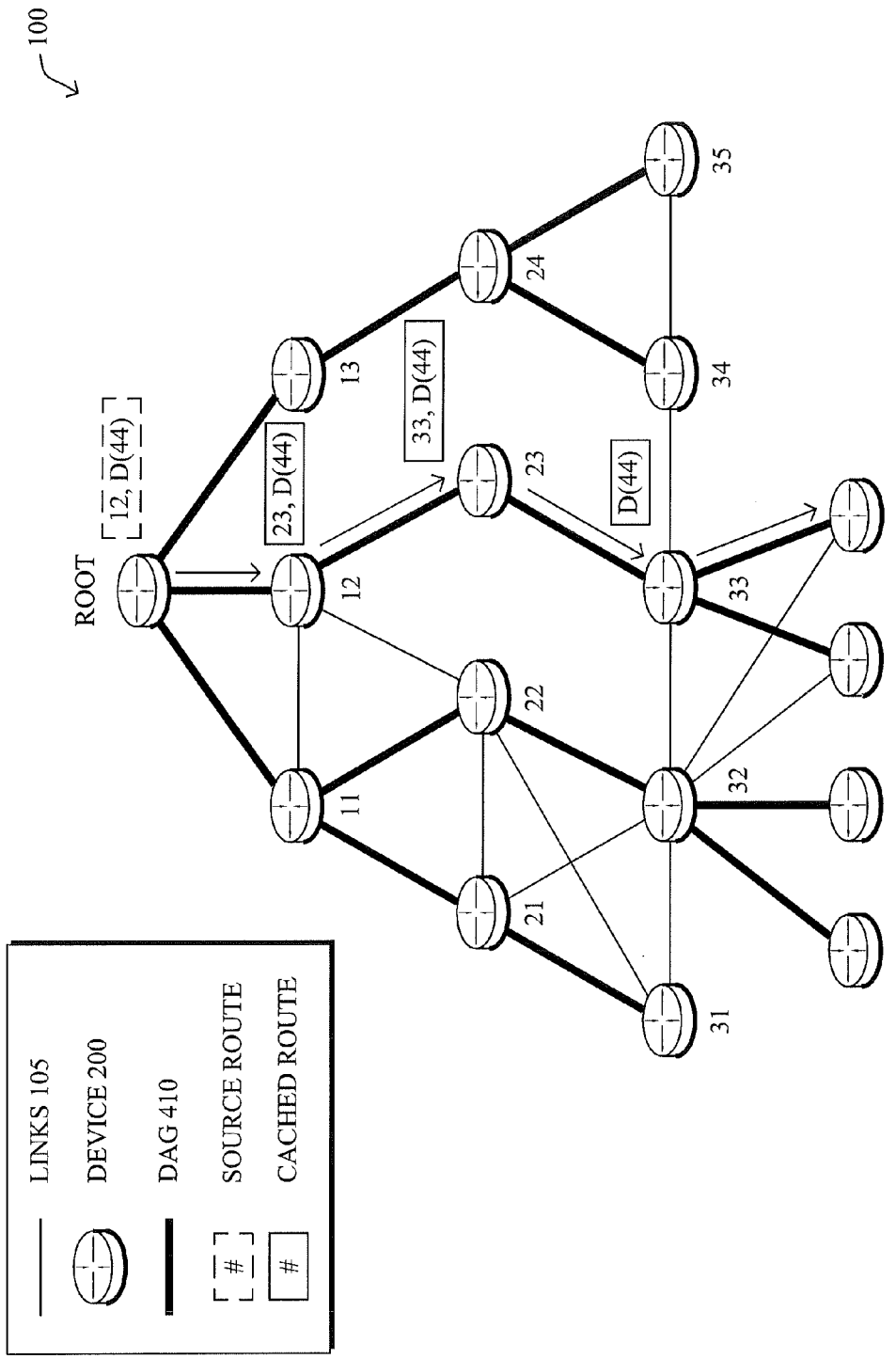

FIG. 6 illustrates each intermediate node along a path of the source route receiving and transmitting subsequent messages destined for destination node 44 according to cached routing entries for respective next hops. In particular, each intermediate node shown in FIG. 6 has a cached routing entry for a respective next hop, as determined from the initial message propagated in FIG. 5 above. In this fashion, a portion of the path (e.g., each next hop) for the source route is cached at each intermediate node. Accordingly, the header information from the source route may be greatly reduced to only the intended next hop (e.g., node 12) and the destination node (e.g., node 44). As discussed above, the cached route entries may be temporal in nature and depend on the route cache indicator. Accordingly, in one embodiment, the root node may add a newly defined IPv6 Hop-by-Hop Option to update the route cache timer, if necessary, to preserve the cached routing entries at respective intermediate nodes. In other embodiments, the root node may add an empty source route header to update the route cache timer along the path of the source route.

Figure 7:
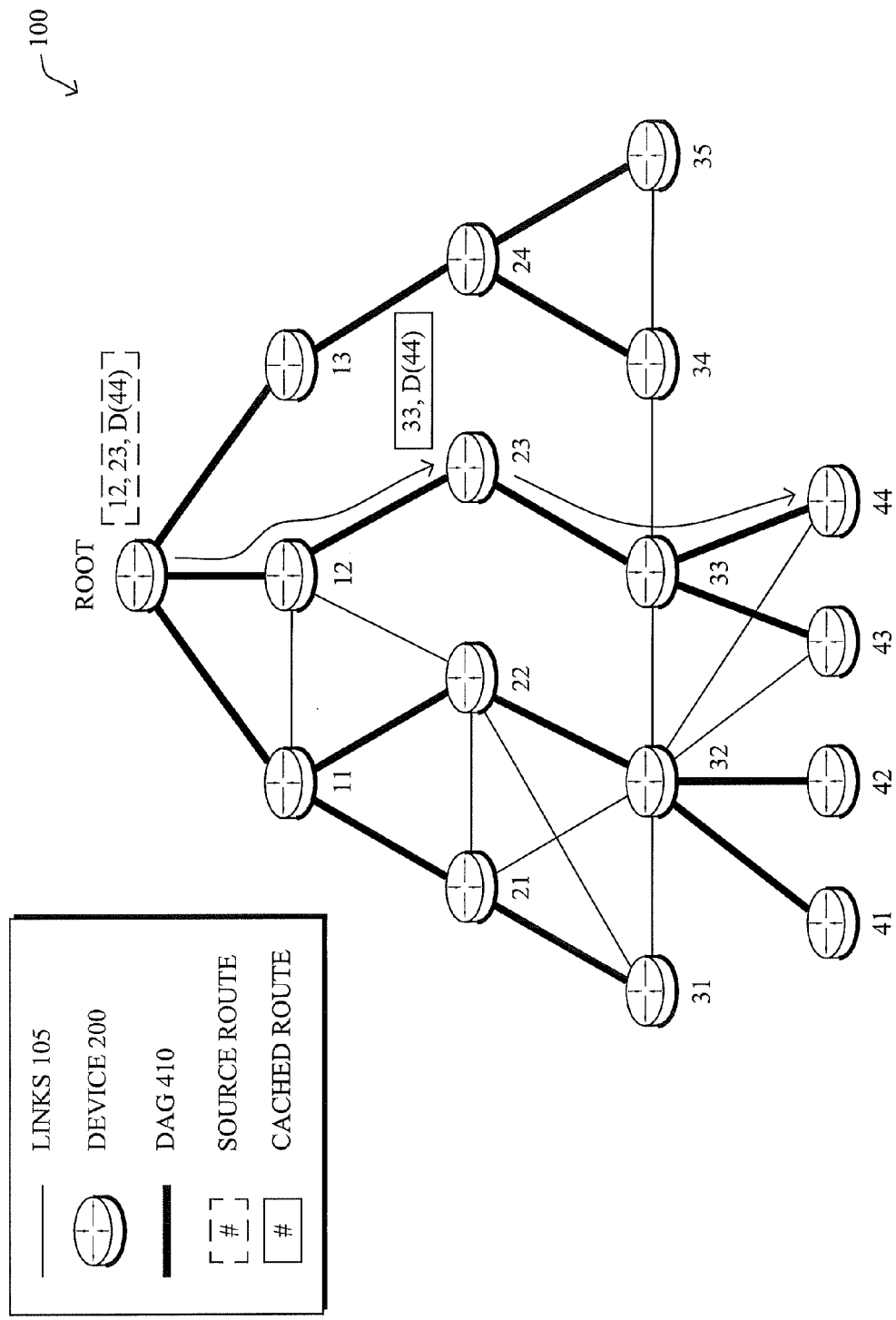

FIG. 7 illustrates an intermediate node or relay node caching the next N hops along the path of the source route. According to FIG. 7, node 23 is a relay node that caches source route information for node 33 to destination node 44. As discussed above, capabilities of intermediate nodes can vary according to available resources, link reliability, link stability, etc. As a result, certain nodes can serve as relay nodes and cache a subset of the source route, rather than requiring a source route header that specifies the full path, only a portion of the path is included in the packet at any one time. In this fashion, each relay point (e.g., node 23) can include a source route for a subset of the path to reach the destination node 44, that is, a source route to the next relay node along the lull path. Specifically, each relay point replaces the source route with an updated path to reach the next relay point. In other words, relay node 23 receives a message having a header that indicates a path up to and including itself (node 23). Relay node 23 updates the header of the message to include the remaining subset of the source route (e.g., 33, D(44)) and transmits the message to a subsequent node.

Notably, in an alternative or additional embodiment, the source route for a message can include one or more tags that are to be interpreted by the relay nodes to generate the required portions of the source route. For instance, the tags may be pre-populated at the relay nodes, such that a particular tag within a source route may be converted (e.g., expanded) into a corresponding route. For example, assuming that node 23 is a relay node, a path to node 44 may be pre-established as 23-33-44, and associated with a tag "P". When node 23 receives a source route with a tag P, then as a relay node, node 23 may insert the determined next hop(s) (according to its routing entry associated with the tag) into the source route, e.g., 23-33-44 (or, simply, 33-44).

As discussed above, nodes in the network can report respective available resources to the root node, as well as their capabilities (e.g., ability to cache any routing state as well as their ability to act as a relay node, caching multiple routing entries). That is, according to one or more embodiments herein, the root node can use this information and determine the number of routing entries an individual node may maintain, and may then make a determination as to whether and/or how to reduce the source routing header of subsequent messages. Additionally, the root node can use this information in certain embodiments to select paths that might have a higher routing cost (e.g., more hops), but that use devices that have more capability (e.g., memory, etc.). In doing so, the root node can make up the overhead for traversing a longer path by removing the source route header overhead.

Figure 8:
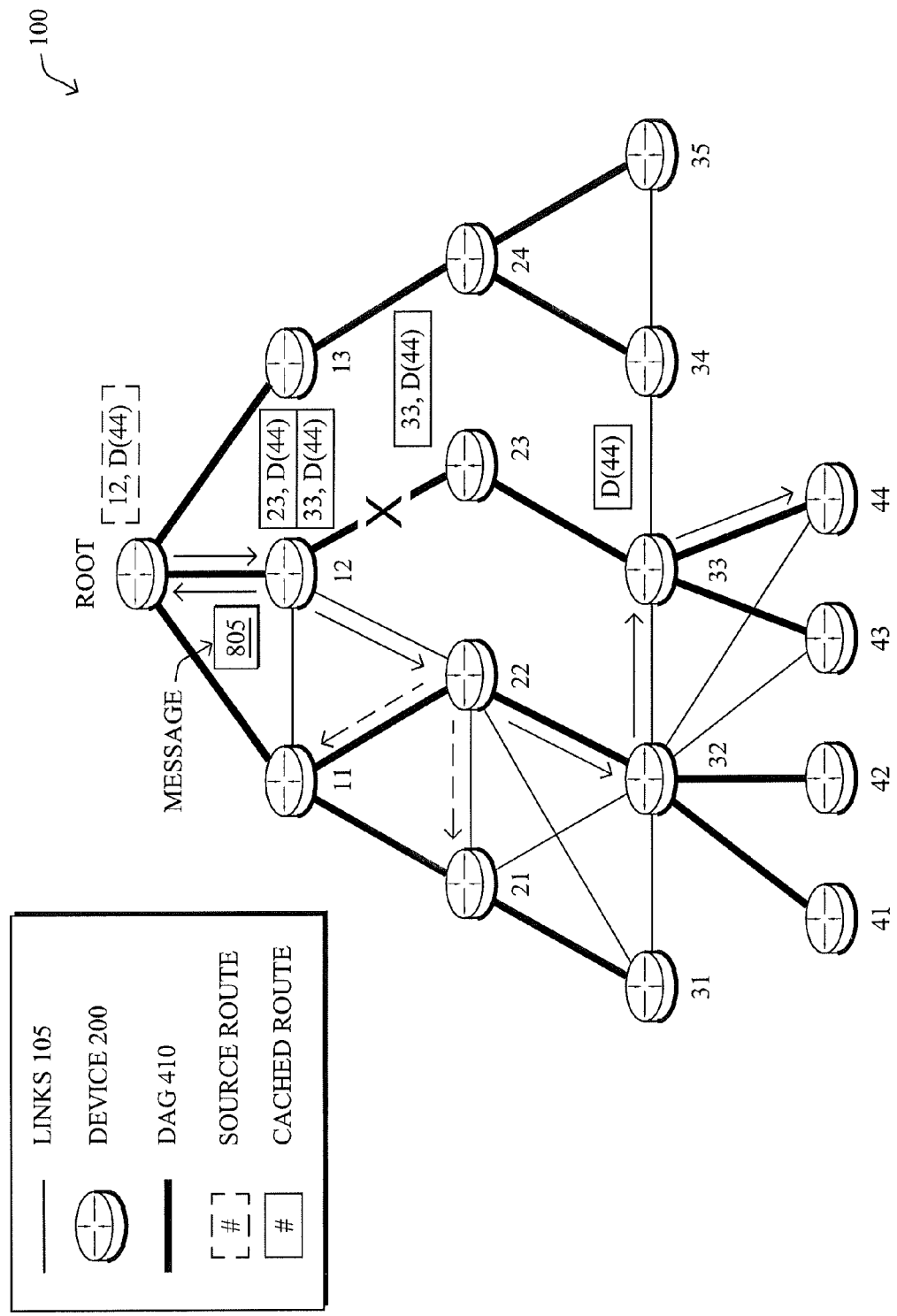

FIG. 8 illustrates an intermediate node caching more than one next hop along the source route. In addition, FIG. 8 illustrates a broken link or path between node 12 and node 23. As illustrated, node 12 has a route to next hop 23 and next-next hop 33 cached. Node 12 receives a message destined for destination node 44, but cannot route the message according to the cached next hop node 23 due to the broken link. Instead, node 12 can attempt to reroute messages to other neighboring devices that may ultimately reach one of the N next-next hops cached. In this instance, node 22 can reach next-next hop 33 via node 32. Accordingly, node 12 transmits the message destined for node 44 via the alternative route to node 22 and subsequently to node 32 to reach next-next hop 33 and destination node 44. In this fashion, node 12 initiates a local route repair mechanism (e.g., limited-scope multicast discovery) to reach next-next hop 33. Moreover, as discussed above, node can send a control message to the root that indicates that a link is broken to the next hop.

Collectively FIGS. 5-8 illustrate reducing header overhead for messages intended for a destination node via cached routing entries at intermediate nodes along a source route path. As discussed above, each intermediate node may cache a next hop, a next-next hop, or a subset of the source route path from an initial message having a header indicating the source route path. In this fashion, subsequent messages can include reduced header information for messages intended for particular destinations.

Figure 9:
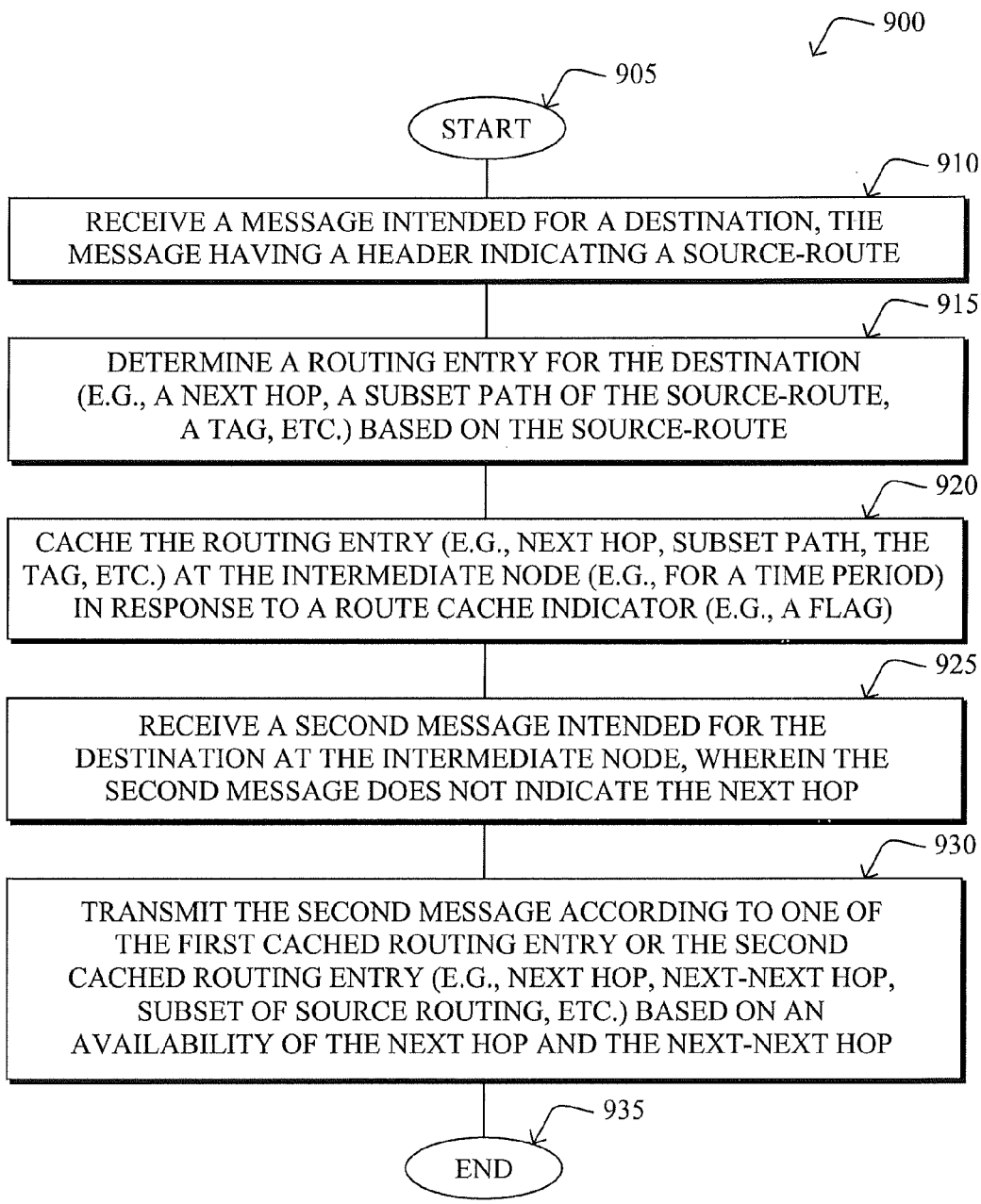
FIG. 9 illustrates an example simplified procedure for routing messages using cached source routes from message headers, particularly from the perspective of an intermediate node.

FIG. 9 illustrates an example simplified procedure 900 for routing messages using cached source routes from message headers, particularly from the perspective of an intermediate node, in accordance with one or more embodiments described herein. The procedure 900 may start at step 905. and continues to step 910, where, as described in greater detail above, an intermediate node receives a message intended for a destination. The message includes a header that indicates a source route. Next, based on the source route, the intermediate node can determine a routing entry for the destination. For example, as discussed above, the routing entry for the destination can include a next hop, a next-next hop, a subset path of the source route, a tag, etc. Once the routing entry is determined, in step 920, the intermediate node caches the routing entry. In some embodiments, the routing entry can be cached in response to detecting a route cache indicator (e.g., a flag) within the message. Moreover, the route cache indicator can also include a time period to cache the routing entry. As discussed above, the intermediate node, in step 925, can also receive a second message intended for the destination. The second message may include a header having reduced source route information (e.g., next hop, next-next hop, etc.). However, the intermediate node can, in step 930, transmit the second message according to the cached routing entries. As discussed above, in the case of a non-reachable next hop node, the intermediate node can perform local re-routing to reach the next-next hop (e.g., via neighboring devices that can reach one of the next N hops). The procedure may end in step 935, or, alternatively, the intermediate node can receive additional messages intended for the destination, as described in step 925.

Figure 10:
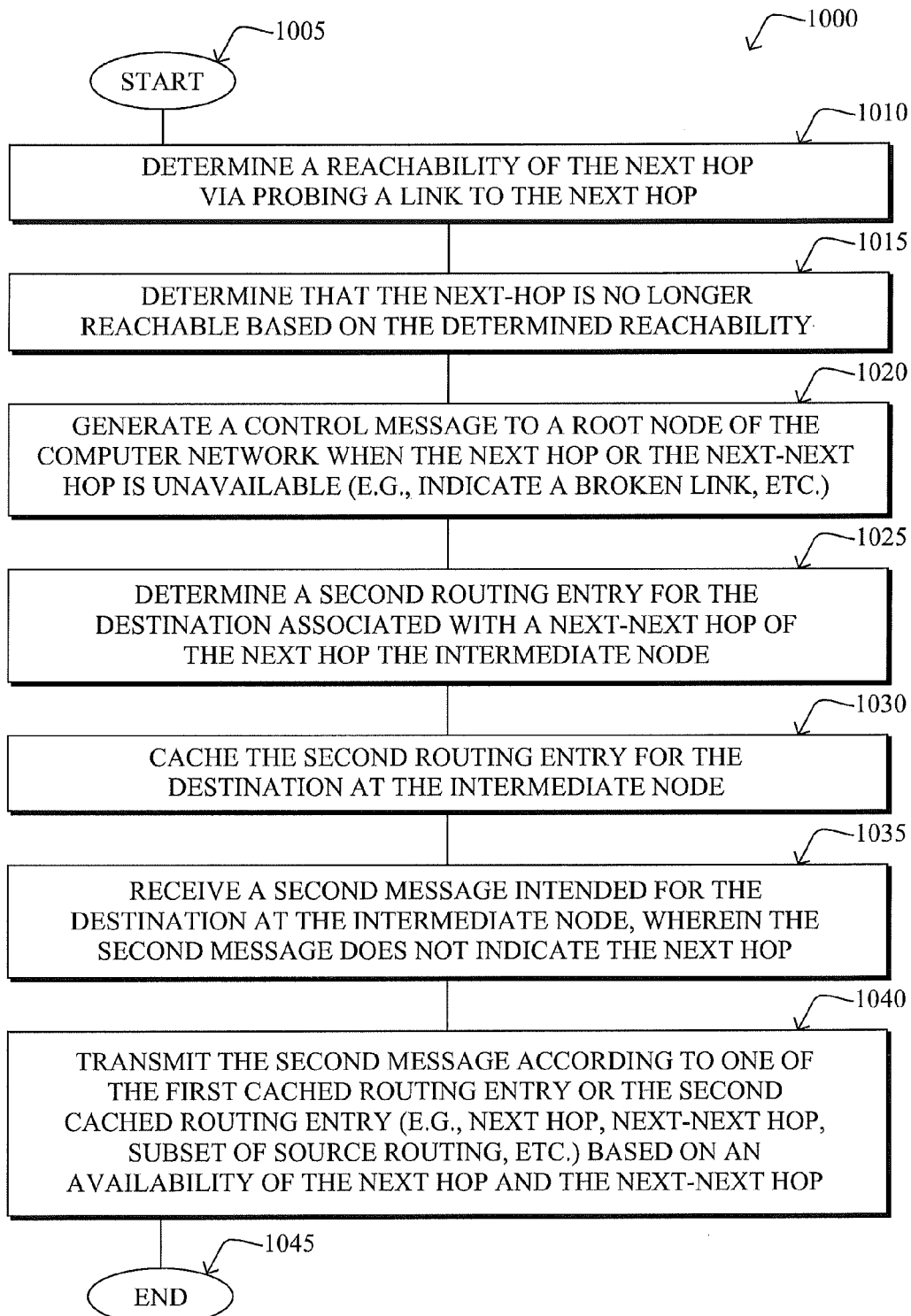
FIG. 10 illustrates another example simplified procedure for routing messages using cached source routes from message headers, also from the perspective of an intermediate node.

In addition, FIG. 10 illustrates another example simplified procedure 1000 for routing messages using cached source routes from message headers, also from the perspective of an intermediate node, in accordance with one or more embodiments described herein. The procedure 1000 starts at step 1005, and continues to step 1010, where, as discussed above, the intermediate node can determine a reachability of a next hop, which next hop can be determined via a first message header having a source route. The intermediate node can determine the reachability via, for example, probe messages that probe a link to the next hop. Further, the reachability can be determined during the time period that the next hop is cached. In the case of a broken link, in step 1015, the intermediate node can determine that the next hop is no longer reachable and, in step 1020, send one or more control messages to a root node indicating the reachability (e.g., indicating a broken link). Notably, the control messages of reachability are not limited to instances of a broken link, but can also be sent to confirm a maintained reachability of the next hop. In some embodiments, in step 1025, the intermediate node can also determine a second routing entry for the destination (e.g., a next-next hop) and, in step 1030, cache the second routing entry. The intermediate node, in step 1035, can receive a second message intended for the destination and having a partial or no source route header. Next, in step 1040, the intermediate node can transmit the second message according to one of the first cached routing entry or the second routing entry, depending on link availability to the next hop and the next-next hop. Procedure 1000 ends in step 1045.

Figure 11:
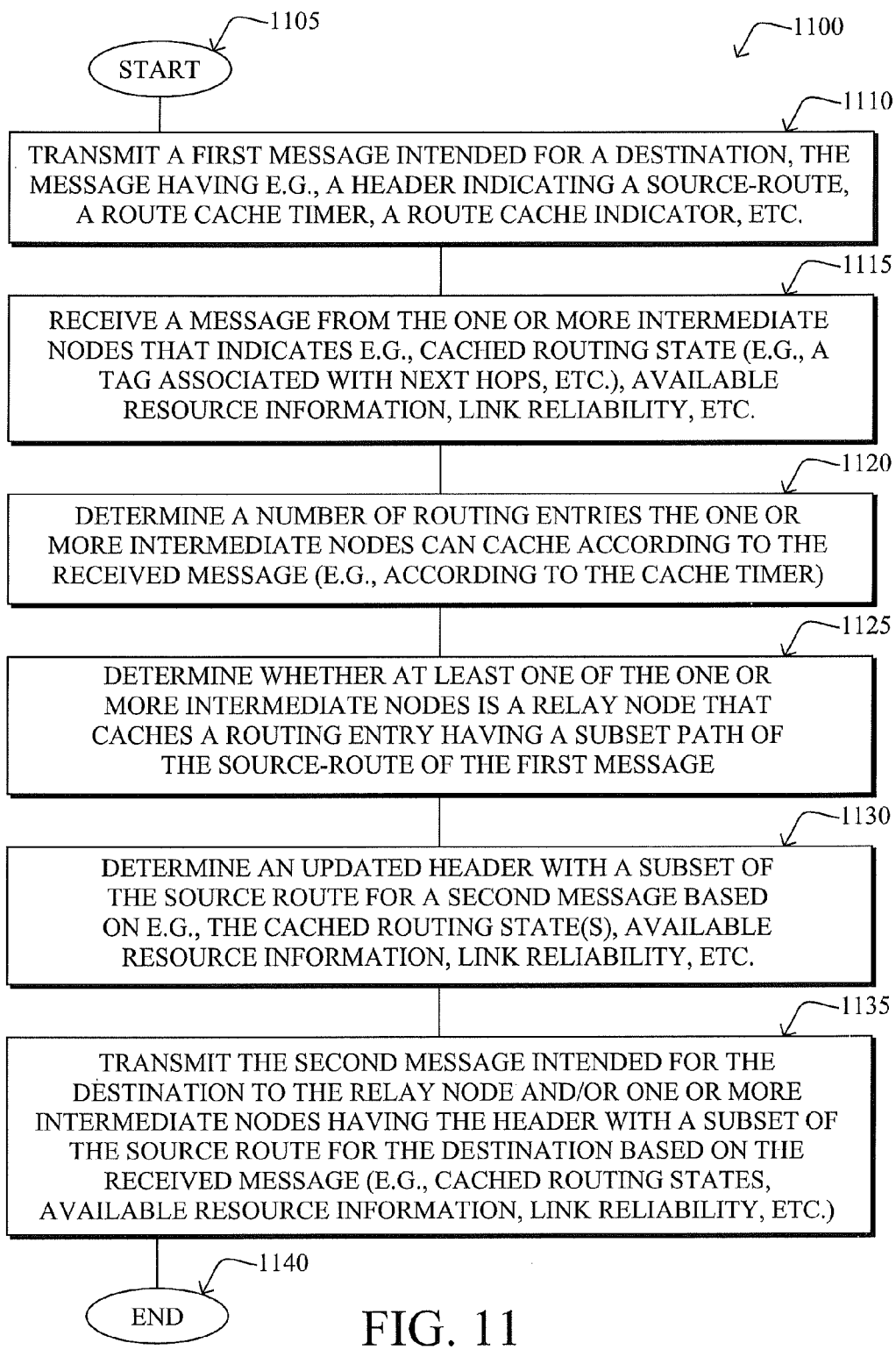
FIG. 11 illustrates an example simplified procedure for routing messages using cached source routes from message headers, particularly from the perspective of a root node.

Moreover, FIG. 11 illustrates an example simplified procedure 1100 for routing messages using cached source routes from message headers, particularly from the perspective of a root node, in accordance with one or more embodiments described herein. The procedure 1100 may start at step 1105, and continues to step 1110, where, as described in greater detail above, a root node can transmit a first message for a destination having a source route. In some embodiments, the first message can also include a route indicator that can include, for example, a timer. As discussed above, the route indicator can cause an intermediate node to cache one or more routing entries associated with N next hops of the source route for a period of time. Next, in step 1115, the head node can receive one or more messages (e.g., data messages, control messages, etc.) from intermediate nodes that indicate a cached routing state, resource availability, link reliability, etc. As discussed above, this routing slate can also confirm that the source route is cached along various intermediate nodes of the source route. In some embodiments, in step 1120 the root node can also determine a number of routing entries the various intermediate nodes can cache according to the received messages. For example, the received messages can further indicate capabilities of respective intermediate nodes, As discussed above, based on the capabilities (e.g., memory, data resources, etc.), the root node can determine the number of routing entries that can be cached for respective intermediate nodes. With this information, the root node can, in step 1125, determine whether one or more of (he intermediate nodes is a relay node. As discussed above, the relay node can cache routing entries having a subset of the source route path. Next, in step 1130, the root node can determine an updated header for a second message to have a shorter (e.g. a partial path or subset) source route to reach intermediate nodes based on the cached routing states. For example, the shorter source route of the updated header may only reach a relay device. Alternatively, in some embodiments, the header may only indicate a next hop if the entire source route is cached along each intermediate node. Next, in step 1135, the root node transmits the second message intended for the destination to one of the intermediate nodes (e.g., a relay node) having the updated header with a subset of the source route. The procedure subsequently ends in step 1140.

It should be noted that while certain steps within procedures 900-1100 may be optional as described above, the steps shown in FIGS. 9-11 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 900-1100 are described separately, certain steps from each procedure may be incorporated into each other procedure, and the procedures are not meant to be mutually exclusive.

The techniques described herein, therefore, provide for routing using cached source routes of messages amongst intermediate nodes of a network. In particular, the techniques herein significantly reduce the overhead of headers in source based routing. Moreover, using the source route header to cause intermediate nodes to cache routing states, no additional control messages are needed to communicate routing information.

While there have been shown and described illustrative embodiments that provide for routing using cached source routes in intermediate nodes, it is to be understood that various other adaptations and modifications may be made within the spirit and scope of the embodiments herein. For example, the embodiments have been shown and described herein with relation to DAG networks. However, the embodiments in their broader sense are not as limited, and may, in fact, be used with other types of networks and/or protocols. In addition, while certain protocols are shown, such as RPL, other suitable protocols may be used, accordingly. Also, while the techniques generally describe initiation and determinations by a root node, a network management system/server (NMS) may also be used to provide intelligence to the network functions described herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
  receiving, at an intermediate node of a computer network, a first message intended for a destination, the first message having a header indicating a source route, wherein a route cache indicator is included within the header that triggers the intermediate node to cache a routing entry and indicates for how long to cache the routing entry;
  in response to the route cache indicator being within the first message:
    determining, by the intermediate node, the routing entry for the destination, the routing entry associated with a next hop of the intermediate node toward the destination based on the source route, wherein the routing entry is a portion of the source route to the destination, and
    caching the routing entry at the intermediate node;
  receiving a second message intended for the destination at the intermediate node, wherein the second message does not indicate the next hop; and
  transmitting, by the intermediate node, the second message according to the cached routing entry to the next hop associated with the destination.

2. The method as in claim 1, further comprising:
  determining a second routing entry for the destination associated with a next-next hop of the next hop the intermediate node;
  caching the second routing entry for the destination at the intermediate node; and
  transmitting the second message according to one of the cached routing entry or the second cached routing entry based on an availability of the next hop and the next-next hop.

3. The method as in claim 2, further comprising:
  generating a control message to a root node of the computer network when the next hop or the next-next hop is unavailable.

4. The method as in claim 1, wherein the routing entry is cached at the intermediate node for a time period, the method further comprising:
  determining reachability of the next hop via probing a link to the next hop;
  determining that the next hop is no longer reachable based on the determined reachability; and
  transmitting a control message to a root node to indicate a broken link based on the determined reachability.

5. The method as in claim 1, wherein determining the routing entry for the destination comprises determining a subset path of the source route to reach the destination; wherein caching the routing entry comprises caching the subset of the source route at the intermediate node; wherein transmitting the second message comprises transmitting the second message according to the subset path, the method further comprising:
updating a header of the second message to include the subset path in the source route.

6. The method as in claim 1, wherein source route of the first message comprises a tag, and wherein determining the routing entry for the destination further comprises determining the routing entry for the destination associated with a plurality of next hops of the intermediate node based on the tag.

7. The method as in claim 1, wherein the routing entry is cached at the intermediate node for a time period based on historical data related to a path stability to the next hop.

8. The method as in claim 7, further comprising:
receiving the time period that the routing entry is cached at the intermediate node from a root node of the computer network.

9. The method as in claim 1, wherein the route cache indicator is a flag in the first message.

10. The method as in claim 1, wherein the route cache indicator is a timer parameter in the first message indicating how long to cache the route entry.

11. A method, comprising:
transmitting, via a root node, a first message intended for a destination to one or more intermediate nodes across a computer network, the first message having a header indicating a source route and includes a route cache indicator that triggers the one or more intermediate nodes to cache the routing entry and for how long to cache the routing entry, wherein the route cache indicator triggers the one or more intermediate nodes to determine and cache a routing entry for the destination, the cached routing entry associated with a next hop of the one or more intermediate nodes toward the destination based on the source route and is a portion of the source route; and
transmitting a second message intended for the destination to the one or more intermediate nodes across the computer network, having a header with a subset of the source route for the destination based on one or more cached routing states of the one or more intermediate nodes.

12. The method as in claim 11, further comprising:
receiving the cached routing state from the one or more intermediate nodes at the root node; and
determining, via the root node, the header with the subset of the source route for the second message based on the cached routing state of the one or more intermediate nodes.

13. The method as in claim 12, wherein each cached routing state of each intermediate node of the one or more intermediate nodes is a tag that is associated with a plurality of next hops of each intermediate node.

14. The method as in claim 12, further comprising:
receiving available resource information from the one or more intermediate nodes;
determining a number of routing entries the one or more intermediate nodes can cache according to the available resource information; and
transmitting a message having a route cache indicator to the one or more intermediate nodes to cause the one or more intermediate nodes to cache the number of routing entries.

15. The method as in claim 14, further comprising:
receiving link reliability information from the one or more intermediate nodes, wherein determining a number of routing entries further comprises determining the number of routing entries one or more intermediate nodes can cache according to the available resource information and the link reliability information.

16. The method as in claim 11, further comprising:
determining that at least one of the one or more intermediate nodes is a relay node, wherein the relay node caches a routing entry having a subset path of the source route of the first message, wherein the second message is transmitted to the relay node and causes the relay node to distribute the second message with an updated header having the at least part of the cached source route.

17. The method as in claim 16, wherein the updated header indicates a subsequent relay node.

18. The method as in claim 11, wherein the first message includes a route cache timer that causes the one or more intermediate nodes to cache a routing entry associated with at least part of the source route for a specified period of time.

19. An apparatus, comprising:
one or more network interfaces of an intermediate node that communicates in a network;
a processor coupled to the one or more network interfaces and adapted to execute one or more processes; and
a memory configured to store a process executable by the processor, the process when executed configured to:
receive a first message intended for a destination, the first message having a header indicating a source route, wherein a route cache indicator is included within the header that triggers the intermediate node to cache a routing entry and for how long to cache the routing entry;
in response to the route cache indicator being within the first message:
determine the routing entry for the destination, the routing entry associated with a next hop of the intermediate node toward the destination based on the source route, wherein the routing entry is a portion of the source route to the destination, and
cache the routing entry at the intermediate node, wherein the cached routing entry is a partial route segment en route to the destination;
receive a second message intended for the destination at the intermediate node, wherein the second message does not indicate the next hop; and
transmit the second message according to the cached routing entry to the next hop associated with the destination.

20. An apparatus, comprising:
one or more network interfaces of a root node that communicates across a computer network;
a processor coupled to the network interfaces and adapted to execute one or more processes; and
a memory configured to store a process executable by the processor, the process when executed configured to:
transmit a first message intended for a destination, the message having a header indicating a source route and includes a route cache indicator that triggers the one or more intermediate nodes to cache a routing entry and indicates for how long to cache the routing entry, wherein the route cache indicator triggers the one or more intermediate nodes to determine and cache the routing entry for the destination, the cached routing entry associated with a next hop of the one or more intermediate nodes toward the destination based on the source route and is a portion of the source route; and transmit a second message intended for the destination to one or more intermediate nodes having a header with a subset of the source route for the destination based on one or more cached routing states of the one or more intermediate nodes.

* * * * *